(12) United States Patent
Chamis et al.

(10) Patent No.: US 6,393,831 B1
(45) Date of Patent: May 28, 2002

(54) EXOSKELETAL ENGINE

(75) Inventors: Christos C. Chamis, Westlake; Isaiah M. Blankson, Solon; William A. Richter, North Royalton, all of OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/722,194

(22) Filed: Nov. 17, 2000

(51) Int. Cl.⁷ .................................................. F02K 3/00
(52) U.S. Cl. ........................................ 60/269; 60/226.1
(58) Field of Search ................................ 60/269, 226.1; 415/91; 416/195, 189, 193 R

(56) References Cited

U.S. PATENT DOCUMENTS

| | | | |
|---|---|---|---|
| 104,600 A | 6/1870 | Kelly | 415/78 |
| 1,030,328 A | 6/1912 | Robinson | 415/78 |
| 1,872,483 A * | 8/1932 | Meyer | 416/195 |
| 3,313,520 A * | 4/1967 | Ortolano et al. | 416/189 |
| 3,556,680 A | 1/1971 | Leutwyler et al. | 417/64 |
| 3,703,081 A | 11/1972 | Krebs et al. | 60/226.1 |
| 3,799,693 A | 3/1974 | Hull | 415/218.1 |
| 4,352,638 A | 10/1982 | Vallance | 417/64 |
| 4,482,297 A | 11/1984 | Mosimann et al. | 216/218 |
| 4,592,202 A | 6/1986 | Stewart et al. | 60/264 |
| 4,684,326 A | 8/1987 | Wassell et al. | 416/215 |
| 5,412,939 A | 5/1995 | Hover et al. | 60/39.33 |
| 5,993,154 A | 11/1999 | Endres et al. | 416/96 R |
| 6,151,882 A * | 11/2000 | Cavanagh | 60/226.1 |

* cited by examiner

*Primary Examiner*—Charles G. Freay
*Assistant Examiner*—Michael K. Gray
(74) *Attorney, Agent, or Firm*—Kent N. Stone

(57) ABSTRACT

A turbojet engine is made from a drum-like portion having a circular blade section extending inwardly therefrom, a support member, and a bearing arranged around a circle having a diameter substantially equal to or greater than the diameter of the blade section. The drum-like portion is rotatably mounted within the support member on the bearing. Instead of a turbine spinning on a shaft, a turbine spinning within a drum is employed.

16 Claims, 4 Drawing Sheets

EXOSKELETAL ENGINE

BACKGROUND OF THE INVENTION

This invention relates to turbine engines and, in particular, to an engine having a rotating drum instead of a rotating shaft.

In order to improve the performance of turbine engines, particularly turbojet engines, it has been common to increase sizes, rotational speeds and/or operating temperatures. This has presented challenges to building reliable engines. Such changes, for example, place increased demands on bearings, turbine blades and discs.

An area of interest has been the increased use of ceramic and other high temperature composites in the high temperature portions of the engine. Unfortunately, using such materials under tension presents its own problems. For example, a simple notch in the material may cause a catastrophic failure. The invention described herein avoids notch sensitivity and other structural problems.

SUMMARY OF THE INVENTION

An engine includes a drum-like portion having a circular blade section extending inwardly therefrom, a support member; and a bearing arranged around a circle having a diameter substantially equal to or greater than the diameter of the blade section. The drum-like portion is rotatably mounted within the support member on the bearing. A drive fluid source provides a fluid to rotate said drum-like portion.

DESCRIPTION OF THE PREFERRED EMBODIMENTS

Figure 1:
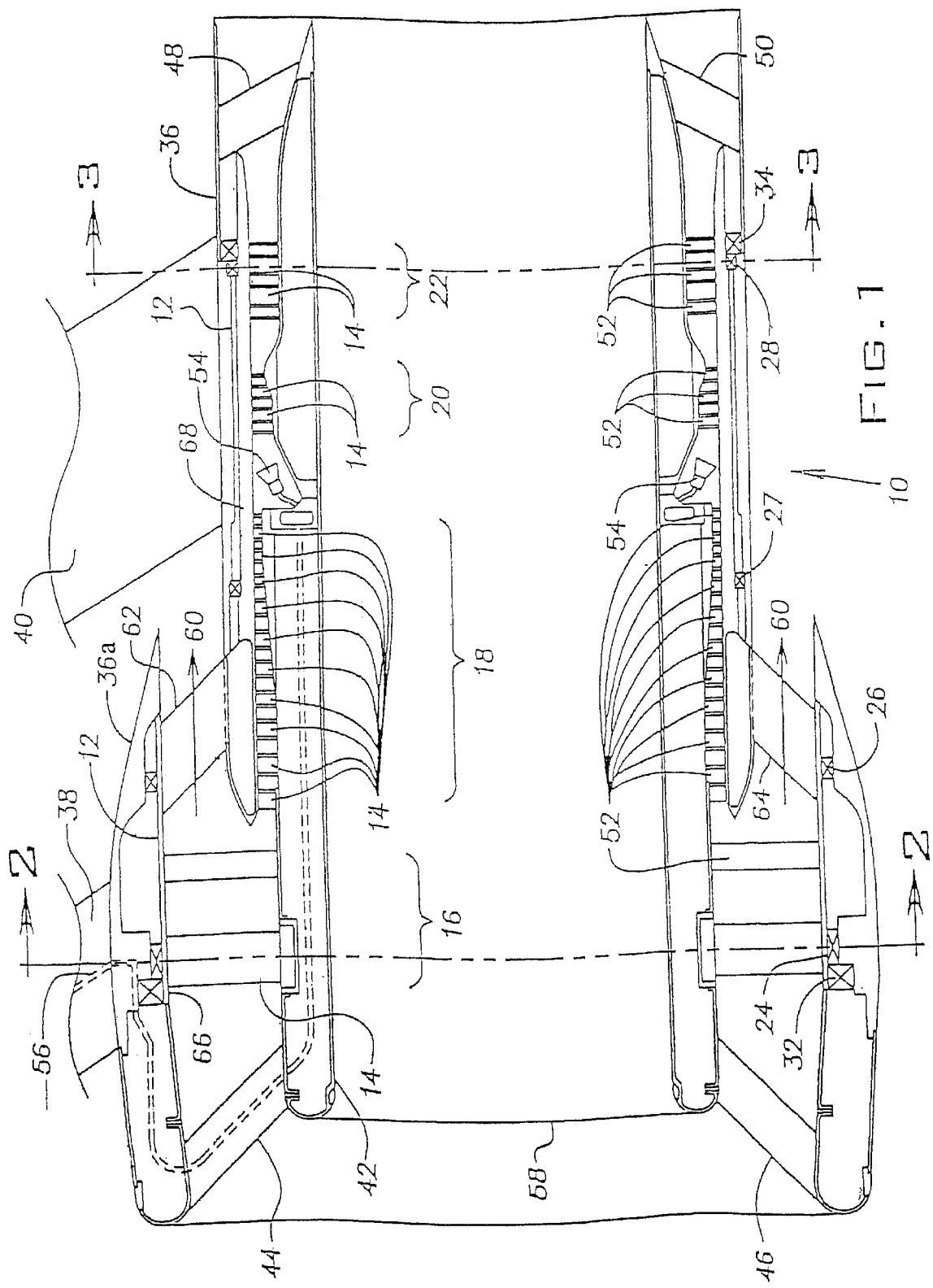
FIG. 1 is a side cross sectional view through the center axis of an engine according to the invention.

Referring to FIG. 1, an engine 10 includes a drum-like portion 12 with inwardly extending circular blade sections 14. In the preferred embodiment, the blade sections 14 may be classified as belonging to a fan section 16, a compressor section 18, a high pressure section 20 or a low pressure section 22. The portion 12 rotates on bearings 24, 26, 27, 28 surrounding the portion 12.

Figure 2:
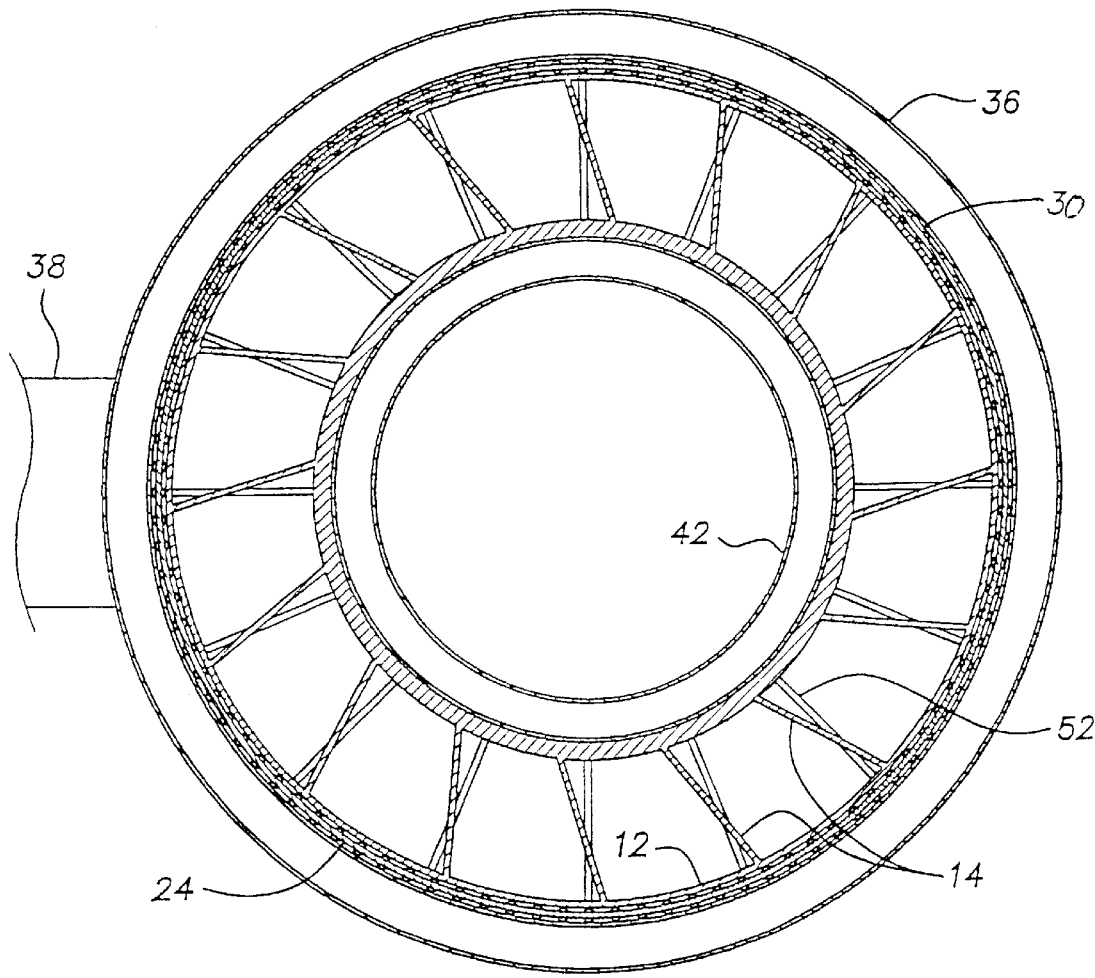
FIG. 2 is a schematic view of a cross section through the line 2—2 of FIG. 1.
Figure 3:
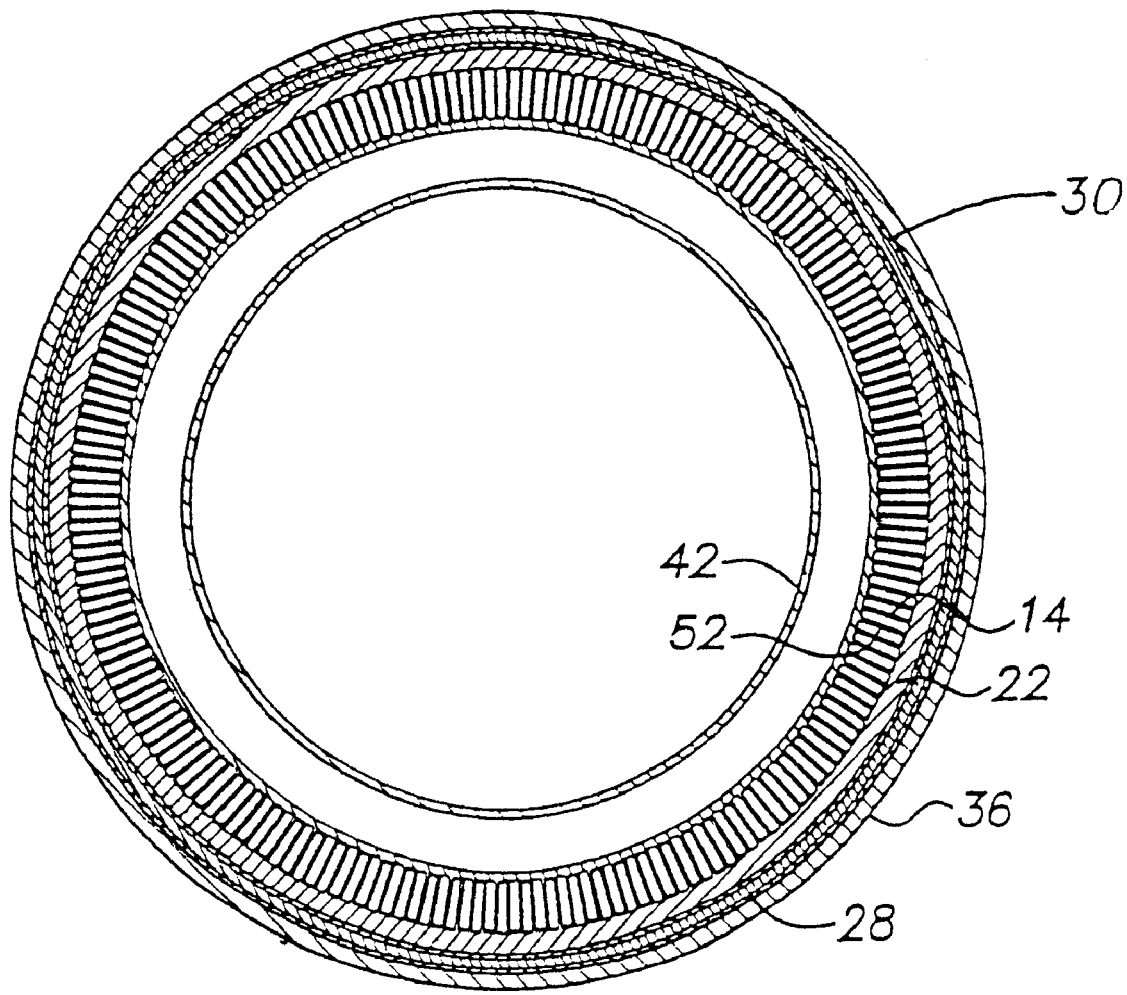
FIG. 3 is a schematic view of a cross section through the line 3—3 of FIG. 1.

In the preferred embodiment, the bearings 24, 26, 27, 28 are arranged about a circle having a diameter that is, for example, equal to or greater than that of one or more of the blade sections 14. For example, the bearings 24, 26, 27, 28 may be a series of caged ball bearings 30 (see FIGS. 2 and 3). It is also possible for the bearings 24, 26, 27, 28 to be, for example, encircling roller bearings or the bearings may be formed from discrete bearings located at, for example, 120, 90, 60 or 45 degree intervals about the portion 12. Thrust bearings 32, 34 are located at the ends of the portion 12 to contain the portion 12 longitudinally.

The bearings 24, 26, 27, 28, 32, 34 are mounted in a support member 36 that generally surrounds the portion 12. The support member 36 may be advantageously attached to an unshown object (e.g., an aircraft wing or fuselage) by means of pylons 38, 40.

A hollow stationary member 42 may be advantageously attached to the support member 36 by pylons 44, 46, 48, 50 in a position coaxial with the portion 12. Other unshown pylons may be spaced out the stationary member to further attach the stationary member 42 to the support member 36.

The stationary member 42 may be advantageously provided with outwardly extending blade sections 52 which may also be classified as belonging to the fan section 16, the compressor section 18, the high pressure section 20 or the low pressure section 22.

Combustors 54 may be advantageously provided ahead of the high pressure section 20. The combustors 54 are supplied with a fuel by a fuel line 56.

Once the drum-like portion 12 is spun up to a suitable speed by methods well known in the turbine art, air is drawn in to the inlet 58 by the fan section 16. In the preferred embodiment, a portion of the air exiting the fan section 16 bypasses the remainder of the engine 10 by exiting through bypass outlets 60 between pylons 62, 64 that attach a forward portion 66 to an aft portion 68 of the drum-like portion 12. Other unshown pylons may be spaced about the forward portion 66 to further attach the forward portion 66 to the aft portion 68.

Another portion of the air exiting the fan section 16 enters the compressor section 18 where it is compressed. The air compressed in the compressor section 18 exits to mix with fuel from the combustors 54 and the mixture burns as it enters the high pressure section 20 followed by the low pressure section 22. The hot expanding combustion gasses act upon the blade sections of the high pressure section 20 and the low pressure section 22 to rotate the portion 12 and, in the preferred embodiment, to provide thrust from the engine 10. Air also passes through the hollow center of the stationary member 42.

In the preferred embodiment, combustion gases provide a drive fluid to rotate the drum-like portion 12 and the blade sections 14. In other embodiments of the invention, it may be desirable to employ other sources of drive fluid.

It should be noted that all rotating components of the engine 10 are in compression. This allow he use of ceramic and other high temperature composites in the high temperature portions of the engine without the constraints of operating such materials in tension. The problem of catastrophic burst discs in turbojets is eliminated along with the weight associated with shielding from such catastrophes. In addition, the large bearing surfaces minimize bearing lubrication requirements.

In general, the engine 10 has fewer parts than prior art engines and, particularly with the use of high temperature composites, weighs, for example, as much as fifty percent less for a given thrust rating.

Figure 4:
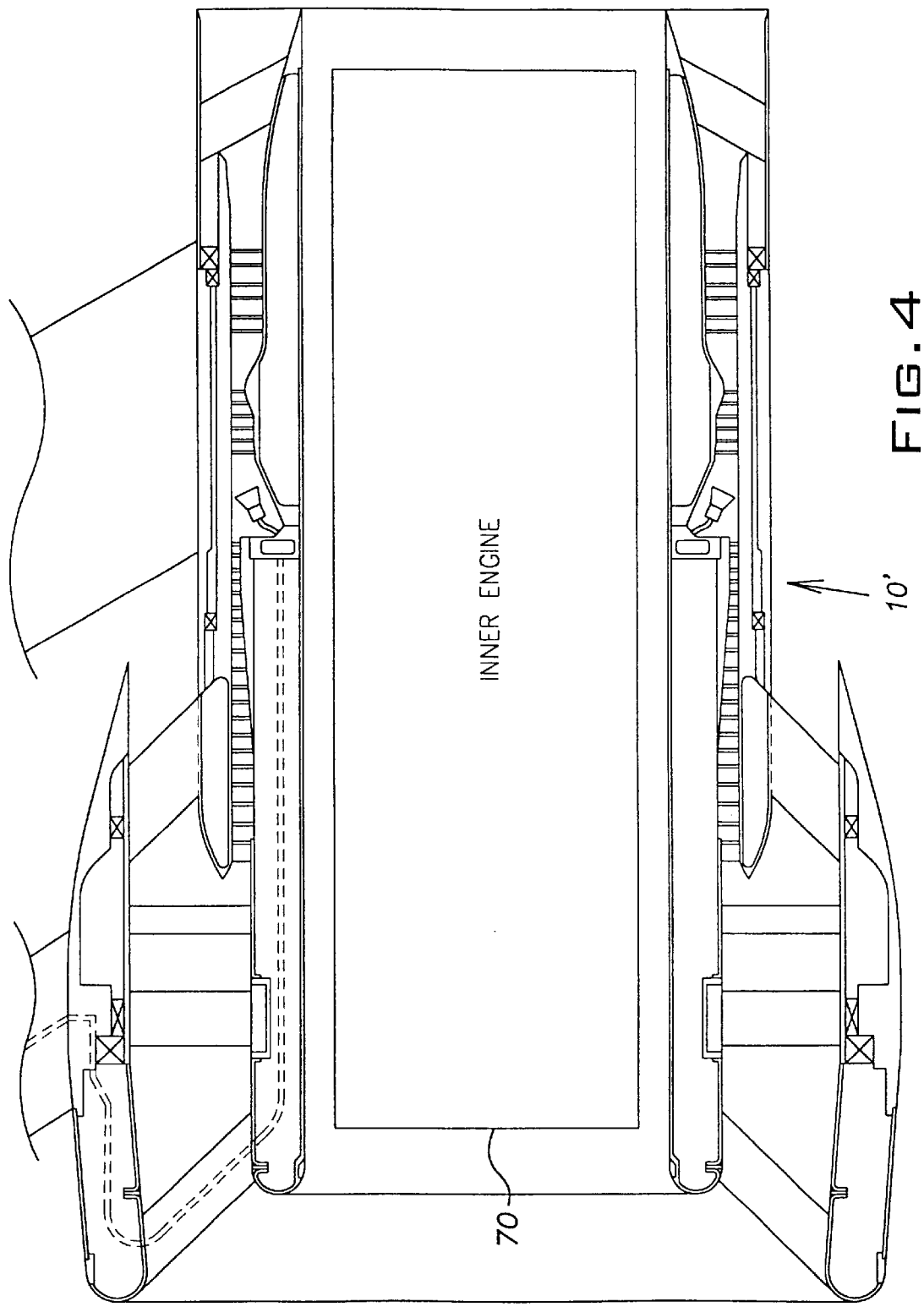
FIG. 4 is a side cross sectional view through the center axis of another engine according to the invention with a schematically indicated non-turbine engine located within the turbine engine.

Referring to FIG. 4, an additional embodiment of the engine 10' includes not only the engine 10, but also another thrust producing engine 70 located within the hollow portion of the stationary member 42. The engine 70 may be, for example, a rocket engine, a ram-jet engine, or other thrust producing engine. It should also be noted that one or more additional coaxial drum-like portions can be used for the engine 70. For example, a counter rotating drum can be mounted within the hollow portion of the stationary member 42 and operated in the same manner as the drum-like portion 12.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An engine, said engine comprising:
   a drum-like portion having a circular blade section extending inwardly therefrom, said section having a diameter;
   a support member;
   a bearing arranged around a circle having a diameter substantially equal to or greater than the diameter of said blade section, said drum-like portion being rotatably mounted within said support member on said bearing; and
   a drive fluid source, said source being adapted to provide a fluid to rotate said drum-like portion;
   wherein said drum-like portion has a forward section and an aft section, said forward and aft sections defining an annular bypass outlet therebetween.

2. An engine according to claim 1, further comprising a hollow stationary member having a blade section extending outwardly therefrom, said stationary member being mounted within said drum-like portion.

3. An engine according to claim 1, further comprising a thrust producing engine mounted within said drum-like portion.

4. An engine according to claim 1, said engine further comprising a stationary member, and an outwardly extending blade section extending from an outer surface of said stationary member.

5. An engine according to claim 1, said blade section comprising a plurality of blades, wherein each of said blades is in compression during operation of said engine.

6. An engine according to claim 5, wherein said blades comprise a ceramic material.

7. An engine according to claim 5, wherein said blades comprise a composite material.

8. an engine according to claim 1, said engine further comprising a stationary member disposed within said drum-like portion, and a thrust producing engine disposed within said stationary member.

9. An engine, said engine comprising:
   a rotatable blade section having an outer periphery;
   a support member having an inner periphery;
   a bearing between said peripheries, said blade section being rotatably mounted within said support member; and
   a drive fluid source, said source being adapted to provide a fluid to rotate said blade section;
   wherein said drum-like portion has a forward section and an aft section, said forward and aft sections defining an annular bypass outlet therebetween.

10. An engine according to claim 9, further comprising a hollow stationary member having a blade section extending outwardly therefrom, said stationary member being mounted within said rotatable blade section.

11. An engine according to claim 9, further comprising a thrust producing engine mounted within said rotatable blade section.

12. An engine according to claim 9, said engine further comprising a stationary member, and an outwardly extending blade section extending from an outer surface of said stationary member.

13. An engine according to claim 9, said blade section comprising a plurality of blades, wherein each of said blades is in compression during operation of said engine.

14. An engine according to claim 13, wherein said blades comprise a ceramic material.

15. An engine according to claim 13, wherein said blades comprise a composite material.

16. (new) an engine according to claim 9, said engine further comprising a stationary member disposed within said drum-like portion, and a thrust producing engine disposed within said stationary member.

* * * * *